United States Patent
Gonnsen (10) Patent No.: US 11,120,173 B2
(45) Date of Patent: Sep. 14, 2021

(54) AIRCRAFT RECONFIGURATOR FOR RECONFIGURING AN AIRCRAFT CONFIGURATION

(71) Applicant: AIRBUS OPERATIONS GMBH, Hamburg (DE)

(72) Inventor: Johannes Gonnsen, Hamburg (DE)

(73) Assignee: Airbus Operations GmbH

( * ) Notice: Subject to any disclaimer, the term of this patent is extended or adjusted under 35 U.S.C. 154(b) by 234 days.

(21) Appl. No.: 15/927,778

(22) Filed: Mar. 21, 2018

(65) Prior Publication Data
US 2018/0210998 A1    Jul. 26, 2018

Related U.S. Application Data

(63) Continuation of application No. PCT/EP2016/074128, filed on Oct. 10, 2016.

(30) Foreign Application Priority Data

Oct. 8, 2015  (DE) .................... 102015117181.3

(51) Int. Cl.
*G06F 30/15*  (2020.01)
*B64D 11/02*  (2006.01)
(Continued)

(52) U.S. Cl.
CPC .............. *G06F 30/15* (2020.01); *B64D 11/02* (2013.01); *B64D 11/04* (2013.01); *B64D 11/06* (2013.01); *B64D 11/00* (2013.01); *G06F 2111/20* (2020.01)

(58) Field of Classification Search
CPC .... G01M 1/127; G06F 30/15; G06F 2111/20; B64D 11/00; B64D 11/02; B64D 11/04; B64D 11/06; B64D 9/00; Y02T 50/46
(Continued)

(56) References Cited

U.S. PATENT DOCUMENTS 8,910,907 B2 * 12/2014 Gonnsen ................ B64D 11/00
244/118.6
2002/0026296 A1 * 2/2002 Lohmann ................ G06F 30/15
703/1
(Continued)

FOREIGN PATENT DOCUMENTS

CN    102893230 A    1/2013
CN    104369867 A    2/2015
(Continued)

OTHER PUBLICATIONS

Kopisch et al., "Configuration of a Passenger Aircraft Cabin based on Conceptual Hierarchy, Constraints and Flexible Control," Industrial and Engineering Applications of Artificial Intelligence and Expert Systems, Springer Berlin Heidelberg, Berlin, Heidelberg, ISBN: 978-3-540-55601-5, pp. 421-430, Jun. 9, 1992.

(Continued)

*Primary Examiner* — Juan C Ochoa
(74) *Attorney, Agent, or Firm* — Lerner, David, Littenberg, Krumholz & Mentlik, LLP (57) ABSTRACT

An aircraft reconfigurator for reconfiguring an aircraft configuration includes a storage unit that stores aircraft specific data of a predetermined initial configuration, and an input unit for inputting a mission specific reconfiguration parameter. The aircraft reconfigurator includes a processing unit for reconfiguring the initial aircraft configuration based on the stored aircraft specific data of the predetermined initial aircraft configuration and the predetermined mission specific reconfiguration parameter so as to design several alternative aircraft configurations, each of which has a different variant of a cabin layout.

10 Claims, 4 Drawing Sheets

(51) Int. Cl.
*B64D 11/04* (2006.01)
*B64D 11/06* (2006.01)
*G06F 111/20* (2020.01)
*B64D 11/00* (2006.01)

(58) Field of Classification Search
USPC .......................................................... 703/1, 8
See application file for complete search history.

(56) References Cited

U.S. PATENT DOCUMENTS

| | | | |
|---|---|---|---|
| 2010/0145492 A1* | 6/2010 | Russell | G06F 30/15 700/103 |
| 2010/0318327 A1 | 12/2010 | Holden et al. | |
| 2011/0172795 A1* | 7/2011 | Hansen | G06Q 10/06 700/97 |
| 2013/0035906 A1 | 2/2013 | Schmidt-Schäffer et al. | |
| 2013/0066602 A1* | 3/2013 | Schmidt-Schäffer | G05B 19/40931 703/1 |
| 2014/0278270 A1 | 9/2014 | Savian et al. | |
| 2015/0048205 A1 | 2/2015 | Seibt et al. | |
| 2015/0205910 A1* | 7/2015 | Lindgren | G06F 30/15 703/1 |

FOREIGN PATENT DOCUMENTS

| | | | |
|---|---|---|---|
| DE | 102006059829 A1 | | 6/2008 |
| DE | 102011016293 | * | 4/2010 |
| DE | 102011016293 A1 | | 10/2011 |
| WO | 2015036390 A1 | | 3/2015 |

OTHER PUBLICATIONS

European Patent Office, International Search Report for International Application PCT/EP2016/074128, dated Jan. 17, 2017, 3 pages.
German Patent and Trademark Office, Search Report for German Patent Application No. 102015117181.3 dated Sep. 26, 2017.
Chinese Search Report for Application No. 201680058774.7 dated Dec. 15, 2020, 2 pages. (p. 1 categorizing the cited references).

* cited by examiner

AIRCRAFT RECONFIGURATOR FOR RECONFIGURING AN AIRCRAFT CONFIGURATION

CROSS-REFERENCE TO PRIORITY APPLICATIONS

This application is a continuation of international patent application number PCT/EP2016/074128, having an international filing date of Oct. 10, 2016, which claims priority to German patent application number DE 102015117181.3, having a filing date of Oct. 8, 2015. The content of the referenced applications is incorporated by reference herein.

TECHNICAL FIELD

Embodiments of the subject matter described herein relate generally to the design of aircraft. In particular, embodiments of the invention relate to an aircraft reconfigurator for reconfiguring an aircraft configuration as well as to a method for reconfiguring an aircraft configuration. The disclosure further relates to a program element as well as to a computer readable medium on which a program element is stored.

BACKGROUND

Typically, aircraft are designed or specified in consideration of a determined mission profile. This happens in consideration of multiple mission parameters based on which system parameters of the aircraft to be designed are adapted. Such system parameters describe aerodynamic characteristics of the aircraft, for example, as well as mechanic characteristics of the aircraft structure which are required for the predetermined mission profile. For this purpose, various optimization methods may be applied so that based on comparisons of different aircraft configurations a selection of the best configuration for the related mission profile may be provided. Such an approach is very time-consuming and is, therefore, cost-intensive, in particular due to the fact that only two configurations can be compared with each other.

Patent publication US 2010/0318327 A1 describes a method for design optimization of a passenger plane. A first computer model is created and is examined in respect of fluid dynamic performance by means of computational fluid dynamics. In particular, a drag coefficient or a lift coefficient are determined. Further a second computer model with a new geometry is created for which, in turn, the fluid dynamic performance is examined.

Patent publication WO 2015/036390 A1 describes a computer-aided design method for a second three-dimensional object based on a first three-dimensional object which is defined by its boundary surfaces only. The second object is an alternative of the first object, wherein the second object is modified with regard to the first object in terms of some parameters.

BRIEF SUMMARY

It is an object of the disclosure to make the development of aircraft more efficient.

This object is solved by the subject matters of the independent claims. Exemplary embodiments can be derived from the dependent claims and the following description.

According to an aspect of the disclosure, an aircraft reconfigurator for reconfiguring an aircraft configuration is provided. The aircraft reconfigurator comprises a storage unit for storing aircraft specific data of a predetermined initial aircraft configuration as well as an input unit for predetermining (may also be referred to as inputting) a mission specific reconfiguration parameter. The aircraft reconfigurator further comprises a processing unit for reconfiguring the initial aircraft configuration based on the stored aircraft specific data of the predetermined initial aircraft configuration and the predetermined mission specific reconfiguration parameter, as to, hence, design multiple alternative aircraft configurations, each of which comprises a different variant of a cabin layout.

Thus, it is possible to design different layouts of aircraft or different aircraft configurations with the aircraft configurator as to ensure an improved adaptation to specific mission parameters, i.e., to a specific mission profile. Thereby, the mission parameters which describe the mission profile may be considered due to the mission specific reconfiguration parameter. For example, the mission specific reconfiguration parameter defines boundary conditions for development of the alternative aircraft configurations. In other words, the predetermined initial aircraft configuration may be modified as a result of the mission specific reconfiguration parameter such that a new aircraft configuration is created which differs from the initial aircraft configuration, wherein the new aircraft configuration is adapted to the modified boundary conditions or to the modified reconfiguration parameter. For example, the alternative aircraft configurations differ from the predetermined initial aircraft configuration in terms of their shape, i.e., their geometry, but also in terms of performance specific data.

One, two, or multiple aircraft configurations may be designed as alternative aircraft configuration to a predetermined initial aircraft configuration. In particular, the alternative aircraft configurations differ from the predetermined initial aircraft configuration with regard to the layout of their cabin arrangement. In other words, different variants of a cabin layout are designed within the alternative aircraft configurations. Thereby, the arrangement of cabin elements, for example, may be different within each of the alternative aircraft configurations. Arrangement of the cabin elements takes place, for example, with regard to a mission profile to be met, i.e., based on the mission specific reconfiguration parameter which is predetermined by an operator, for example.

Such a cabin element is, for example, a seat, a galley, a lavatory module or another monument within the cabin of the aircraft. For example, the aircraft is an airplane and, in particular, a passenger plane, so that the aircraft reconfigurator is configured to design alternative passenger aircraft configurations each of which comprises different cabin layouts. The different variants of the cabin layout may differ from each other with respect to an arrangement and/or a number of different cabin elements, i.e., aircraft components, within the cabin of the aircraft.

For example, the aircraft specific data are data with regard to the geometry of the predetermined initial aircraft configuration, as for example the dimensions of the aircraft fuselage or information with regard to an arrangement and/or number of cabin elements of the predetermined initial aircraft configuration. The arrangement of cabin elements within the predetermined initial aircraft configuration also comprises, for example, dimensions of the cabin element within the aircraft configuration and, hence, also of the cabin layout. The aircraft specific data may further comprise performance related data as, for example, travel speed, cruising altitude, or maximum range of the predetermined initial aircraft configuration. In other words, almost any performance parameters of the predetermined initial aircraft configuration may be represented by the aircraft specific data, so that the predetermined initial aircraft configuration can be unambiguously described by the aircraft specific data.

For example, the mission specific reconfiguration parameter may be a variable parameter of the aircraft specific data. For example, a modification of the arrangement and/or of the number of cabin elements within the predetermined initial aircraft configuration may be described by the mission specific reconfiguration parameter, so that subsequently at least one alternative aircraft configuration is designed based on the modified arrangement and/or number of the cabin elements within the initial aircraft configuration by means of a description logics or by means of an algorithm being carried out by the aircraft reconfigurator. Thereby, the position of multiple further cabin elements may vary due to the modification of even a single cabin element, so that this results in a completely new layout of an aircraft configuration.

According to an embodiment of the invention, the aircraft specific data comprise information relating to a design and dimensions of the predetermined initial aircraft configuration.

For example, geometric data, as for example length, wing span, or also dimensions relating to the fuselage cross section, may be considered by the aircraft specific data. Further, it may be provided that performance related parameters as, for example, maximum range, optimal cruising altitude, travel speed, or maximum take-off weight may be taken into account. In particular, the predetermined initial aircraft configuration can be unambiguously and completely described by the aircraft specific data, so that an aircraft type or kind of an aircraft can be unambiguously determined on the basis of the aircraft specific data. Hence, as a result of the reconfiguration, it is possible to rebuild or reshape an initial aircraft configuration or multiple similarly designed initial aircraft configurations.

According to a further embodiment of the invention, the mission specific reconfiguration parameter comprises information about an arrangement and/or a number of a first aircraft component within the alternative to-be-designed aircraft configuration. In particular, the aircraft component may be a cabin element.

Such an aircraft component is, for example, a seat or a passenger seat of the aircraft, a galley, a lavatory monument or another monument within the passenger cabin of the aircraft. Now, the arrangement and/or the number of this first aircraft component within the passenger cabin of the alternative to-be-designed aircraft configuration may be predetermined or adjusted by the mission specific reconfiguration parameter.

For example, the arrangement and/or the number of lavatories or galleys within a passenger cabin of the alternative to-be-designed aircraft may be defined, so that subsequently all other cabin elements of the passenger cabin may be adapted with respect to their arrangement and/or their number. Thereby, multiple different, i.e., alternative, layouts for the passenger cabin of the aircraft may be designed.

According to a further embodiment of the invention, the processing unit is configured to position additional aircraft components depending on the arrangement and/or the number of the first aircraft component within the alternative to-be-designed aircraft configurations.

Thus, multiple options, i.e., multiple variants, of aircraft configurations may be designed which are provided on the basis of a predetermined modification of the arrangement and/or the number of the first aircraft component. In other words, a specific aircraft component is modified with respect to its arrangement and/or its number relative to the initial aircraft configuration such that other aircraft components are likewise modified with respect to their arrangement and/or their number and, hence, multiple alternative aircraft configurations are created.

According to a further embodiment of the invention, the first aircraft component is a lavatory or a galley within a passenger cabin of the alternative to-be-designed aircraft configuration.

However, other objects or arrangements within the passenger cabin may be referred to by the aircraft component. For example, a minimum number of galleys or lavatories within the passenger cabin may be calculated. The arrangement or the position of the galley or of the lavatory may here take place in such a manner that various passenger regions, in particular different types (classes) of passenger seats, may be supplied by the same lavatory or galley. In other words, a specific number of passenger seats in different passenger regions may be determined and adapted as a result of specifying the arrangement and/or the number of lavatories or galleys. Preferably, the position, the orientation and/or the number of the galleys or of the lavatories is predetermined here, as seats, separating walls, storage compartments, or ceiling paneling require less reconfiguration time in comparison to galleys or lavatories of the passenger cabin. In other words, specific aircraft components may be predetermined and frozen within the to-be-designed aircraft configuration, whereupon all other aircraft components are adapted within the same passenger cabin with respect to their arrangement and/or number to the defined or frozen arrangement and/or number of predetermined aircraft components. Hence, multiple alternative variants of a cabin layout may be created which are comprised by the alternative aircraft configurations.

According to a further embodiment of the invention, the other aircraft components are seats within the to-be-designed alternative aircraft configuration.

Thereby, the positions of the seats are varied with regard to a defined or frozen position and/or number of lavatories or galleys, for example, so that alternative aircraft configurations with different arrangements and/or different numbers of passenger seats are created.

According to a further embodiment, the processing unit is configured to determine a required time and/or required costs for reconfiguring the predetermined initial aircraft configuration for each one of the alternative aircraft configurations.

Determining of the required time and/or of the required costs for reconfiguring may consider development times as well as production times of the alternative aircraft configurations. In particular, the required costs and/or the required time from providing the aircraft specific data of the predetermined initial aircraft configuration until delivery of at least one alternative aircraft configuration may be determined. Thus, a comparison of the required time and/or of the required costs for each one of the alternative aircraft configurations may be carried out, so that predetermined conditions during development of an alternative aircraft configuration may be met. For determining the costs and the time, given expenses of the rebuild or of the restructuring may be combined with maintenance work. Further, it may be provided that a layout of an aircraft configuration is created in consideration of a limit due to an available cost budget and/or a predetermined rebuild time.

According to a further embodiment of the invention, the processing unit is configured to determine a production timetable for reconfiguring the predetermined initial aircraft configuration.

Thus, different production stages or the required time for different production stages may be determined, so that coordinating the different process steps and, therefore, coordinating the mounting personnel during manufacturing of the alternative aircraft configurations can be ensured. In other words, modifications in the layout of the predetermined initial aircraft configuration are indicated based on the production timetable, wherein also maintenance work for the subsequent operation of the aircraft may be considered. In particular, production times as well as maintenance times as a result of the production timetable may be considered. Further, work and test tasks may be optimized by the production timetable, so that the reconfiguration may be carried out by multiple teams, i.e., different mounting personnel, in an effective manner with the available resources. For example, division of labor may be provided inside the mounting teams. Thereby, different seat regions of the passenger cabin may be handled by different mounting teams, wherein also an overlapping of the areas of responsibility of different mounting teams may be possible.

According to a further embodiment of the invention, the mission specific reconfiguration parameter comprises information relating to a reconfiguration time and/or reconfiguration costs.

In other words, also the reconfiguration time and/or the reconfiguration costs may be provided for design of the alternative aircraft configurations, so that only a selection of alternative aircraft configurations is determined which may be designed in the predetermined reconfiguration time and/or with the predetermined reconfiguration costs. Thereby, also a replacement of cabin elements or aircraft components within the to-be-designed alternative aircraft configurations may take place, so that all possible cabin layouts can be determined by the aircraft reconfigurator which can be designed within the predetermined reconfiguration time and/or with the predetermined reconfiguration costs.

According to a further embodiment of the invention, the processing unit is configured to carry out a comparison of the alternative aircraft configurations, as to subsequently make a choice of only one preferred alternative aircraft configuration for a specific mission.

In other words, a comparison of the designed alternative aircraft configurations may be carried out by the aircraft reconfigurator, as to set up a hierarchy with respect to the designed alternative aircraft configurations, for example. This hierarchy may be an indicator for the suitability of the individual alternative aircraft configurations for specific missions. Further, the most suitable aircraft configuration may be selected with regard to a specific mission. In other words, a decision for a specific aircraft configuration from the alternative aircraft configurations may be made. Thereby, advantages and drawbacks of the individual configurations may be weighed up against each other. The comparison may consider, for example, costs, weight, center of gravity position, turn-around time at the airport, rebuild time, etc.

According to an aspect of the disclosure, a method for reconfiguring an aircraft configuration is provided. In one step of the method, storing of aircraft specific data of a predetermined initial aircraft configuration by a storage unit takes place. In a further step, predetermining a mission specific reconfiguration parameter by an input unit takes place and in a further step, reconfiguration of the initial aircraft configuration based on the stored aircraft specific data of the predetermined initial aircraft configuration and the predetermined mission specific reconfiguration parameter takes place by a processing unit, as to, thereby, automatically design multiple alternative aircraft configurations, each of which comprises a different variant of a cabin layout.

According to a further aspect of the disclosure, a program element is provided which instructs an aircraft reconfigurator to carry out different steps when being carried out on a processor of the aircraft reconfigurator. In a first step, storing of aircraft specific data of a predetermined initial aircraft configuration takes place by a storage unit. In a further step, predetermining a mission specific reconfiguration parameter takes place by an input unit and in a further step, reconfiguration of the initial aircraft configuration based on the stored aircraft specific data of the predetermined initial aircraft configuration and the predetermined mission specific reconfiguration parameter takes place by a processing unit, as to, thereby, automatically design multiple alternative aircraft configurations, each of which comprises a different variant of a cabin layout.

According to a further aspect of the disclosure, a computer readable medium is provided on which the described program element is stored.

With the inventive aircraft reconfigurator, it is enabled to carry out precalculations or specifications for given cabin elements, i.e., aircraft components, and to subsequently adapt further aircraft components within the same cabin with respect to their arrangement and/or their number. In other words, permitted positions or arrangements and/or a number of an aircraft component are given, whereupon further aircraft components within the cabin adapt in terms of their positions or arrangements and/or their number, so that multiple different variants of alternative aircraft configurations are designed.

For designing the different alternative aircraft configurations, a description logic or an algorithm may be used, so that the alternative aircraft configurations can be designed or created with the aircraft reconfigurator. Hence, multiple solutions are presented based on a specification of a specific aircraft component. Two or more optimized layouts of cabin arrangements and, hence, of aircraft configurations may be designed, wherein the time and the costs for reconfiguring may be considered. On the other hand, multiple alternative aircraft configurations may be designed based on a specification of a given reconfiguration time or based on a specification of reconfiguration costs.

The aircraft component may be, for example, a galley, a lavatory, a storage compartment, a separating wall, a seat, or electric equipment within the initial aircraft configuration or within the to-be-designed alternative aircraft configurations.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The representations in the drawings are schematic and not to scale.

If in the following description of the drawings similar reference signs are used in different drawings, these refer to equal or similar elements. However, equal or similar elements may be referred to by different reference signs.

Figure 1:
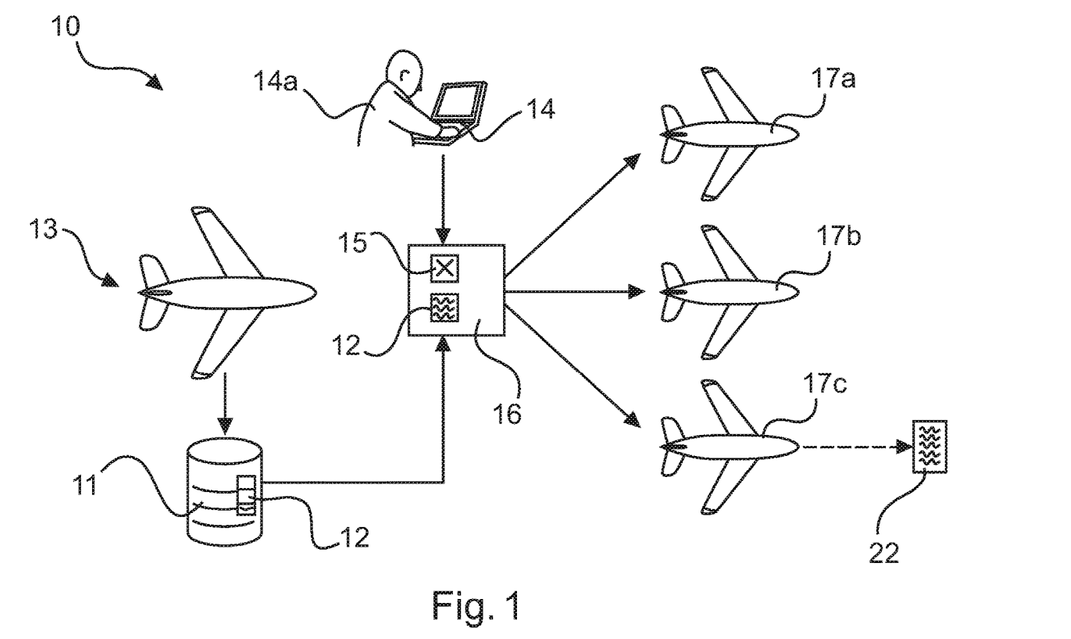
FIG. 1 shows an aircraft reconfigurator for reconfiguring an aircraft configuration according to an exemplary embodiment of the invention.

FIG. 1 shows an aircraft reconfigurator 10 which shows reconfiguring an initial aircraft configuration 13, as to, hence, design multiple alternative aircraft configurations 17a, 17b, 17c based on predetermined data. Thereby, aircraft specific data 12 are stored in a storage unit 11, wherein the aircraft specific data 12 comprise, in particular, geometric data like dimensions of the initial aircraft configuration 13, but also performance related data of the initial aircraft configuration 13. Further, the aircraft reconfigurator 10 comprises an input unit 14 for predetermining a mission specific reconfiguration parameter 15. Thereby, an operator 14a, which is a development engineer, for example, may predetermine the mission specific reconfiguration parameter 15, so that a processing unit 16 designs multiple alternative aircraft configurations 17a, 17b, 17c based on the predetermined mission specific reconfiguration parameter 15 and the aircraft specific data 12 from the storage unit 11, wherein each one of the alternative aircraft configurations 17a, 17b, 17c comprises a different variant of a cabin layout.

Thereby, reconfiguration of the initial aircraft configuration 13 happens in the processing unit 16, so that multiple alternative aircraft configurations 17a, 17b, 17c may be generated automatically. In particular, a plurality of alternative aircraft configurations may also be designed, wherein, however, at least one alternative aircraft configuration 17a is designed. Here, the mission specific reconfiguration parameter 15 comprises, for example, information about the arrangement and/or a number of an aircraft component within the alternative to-be-designed aircraft configurations 17a, 17b, 17c. Further, the mission specific reconfiguration parameter 15 may also comprise information relating to a reconfiguration time and/or information relating to reconfiguration costs.

Hence, the aircraft reconfigurator 10 is able to design the alternative aircraft configurations 17a, 17b, 17c based on the predetermined initial aircraft configuration 13 by using the aircraft specific data 12 of the predetermined initial aircraft configuration 13 and the predetermined mission specific reconfiguration parameter 15. In the example shown in FIG. 1, three alternative aircraft configurations 17a, 17b, 17c are thereby designed. Each one of the alternative aircraft configurations 17a, 17b, 17c comprises a different variant of a cabin layout. This will be elucidated in more detail in FIG. 2.

The predetermined initial aircraft configuration 13 is, for example, an already existing aircraft configuration or an existing aircraft. Here, the term aircraft configuration may be understood, in particular, as type or kind of an aircraft.

Figure 2:
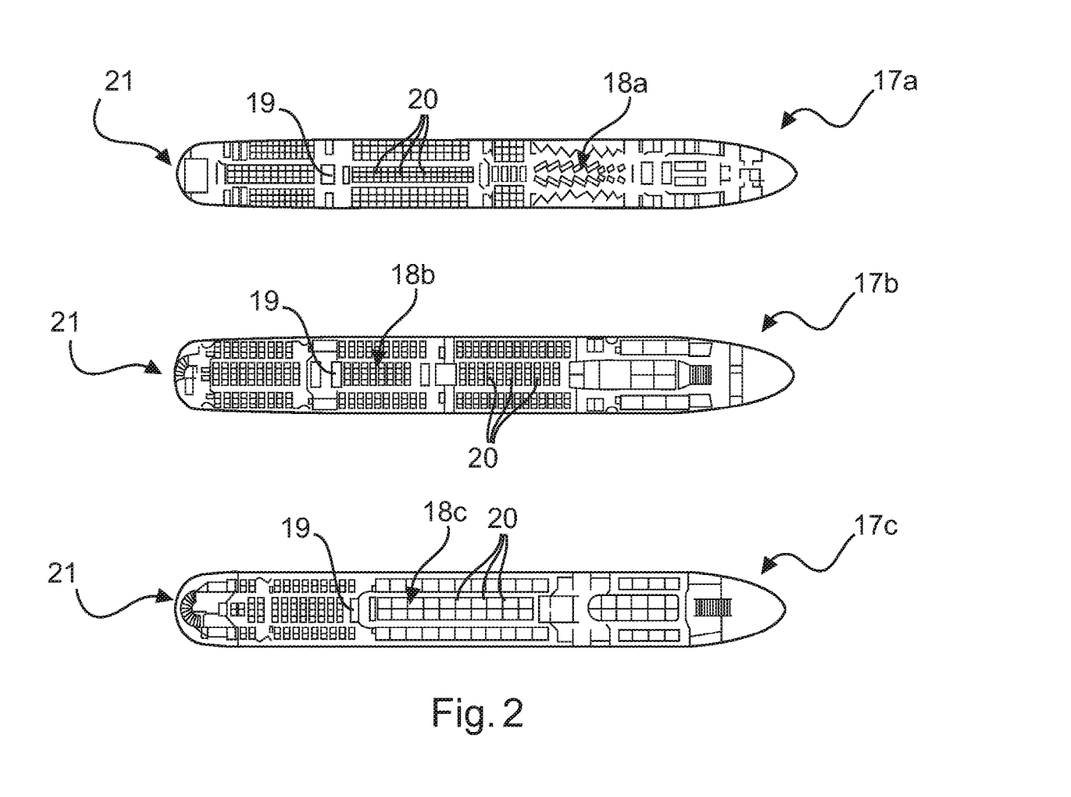
FIG. 2 shows alternative aircraft configurations according to an exemplary embodiment of the invention.

FIG. 2 shows three alternative aircraft configurations 17a, 17b, 17c, each having a different variant of a cabin layout 18a, 18b, 18c. Here, the dimensions of the fuselage of the alternative aircraft configurations 17a, 17b, 17c may be similar in each case, however, also different fuselage configurations may be designed, as indicated in FIG. 2. Anyway, the mission specific reconfiguration parameter 15 comprises information about an arrangement and/or a number of a first aircraft component 19 within the alternative to-be-designed aircraft configuration 17a, 17b, 17c. The first aircraft component 19 is, for example, a galley or a lavatory within the passenger cabin 21 of the respective aircraft or of the respective aircraft configuration 17a, 17b, 17c. The processing unit 16 is configured to position additional aircraft components 20 depending on the arrangement and/or the number of the first aircraft component 19 within the alternative to-be-designed aircraft configurations 17a, 17b, 17c. In other words, the position of the first aircraft component 19 is frozen within the respective configuration, i.e., is fixedly set or defined, so that subsequently the position of the additional aircraft components 20 is adapted and varied with respect to the already defined position of the first aircraft component 19. Hence, different cabin layouts may be provided based on a specification of the position of specific first aircraft components 19. In other words, other aircraft components may be specified and positioned within the alternative to-be-designed aircraft configuration 17a, 17b, 17c in addition to the first aircraft component 19, whereupon additional aircraft components 20 are varied and adapted in terms of their arrangement and/or number within the same cabin 21. Here, varying and adapting means that the additional aircraft components 20 may be modified in terms of their position and/or number within the entire passenger cabin 21.

Figure 3:
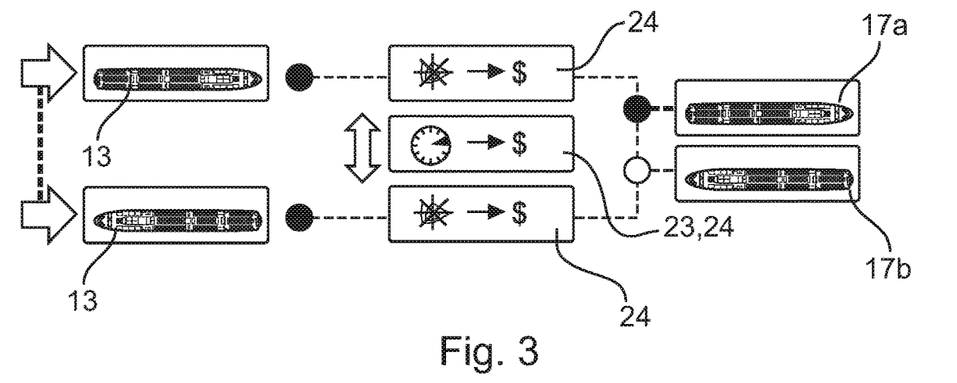
FIG. 3 shows specification of a mission specific reconfiguration parameter for reconfiguring an aircraft configuration according to an exemplary embodiment of the invention.

FIG. 3 shows reconfiguring of two alternative aircraft configurations 17a, 17b based on predetermined aircraft specific data 12 and of a mission specific reconfiguration parameter 15. Here, in particular two different initial aircraft configurations 13 may be given as to generate, in turn, two alternative aircraft configurations 17a, 17b. Further, boundary conditions as, for example, a required time 23 and/or required costs 24 in the form of aircraft specific data 12 but also in form of a mission specific reconfiguration parameter 15 may be predetermined.

Hence, two alternative approaches for reconfiguring an aircraft configuration may be distinguished from each other. This is, on the one hand, predetermining a mission specific reconfiguration parameter 15 which comprises information about an arrangement and/or a number of a first aircraft component 19 within the alternative to-be-designed aircraft configurations 17a, 17b, 17c. And on the other hand, it is predetermining a mission specific reconfiguration parameter 15 which comprises information about a reconfiguration time 23 and/or reconfiguration costs 24. In the latter case, in particular the reconfiguration time 23 and/or the reconfiguration costs 24 are fixedly given or predetermined, whereupon multiple alternative aircraft configurations 17a 17b may be designed which may be provided in the given time frame or within the given costs. It is further possible that the mission specific reconfiguration parameter 15 comprises information about an arrangement and/or a number of a first aircraft component 19 within the alternative to-be-designed aircraft configurations 17a, 17b, 17c as well as information about a reconfiguration time 23 and/or reconfiguration costs 24.

Figure 4:
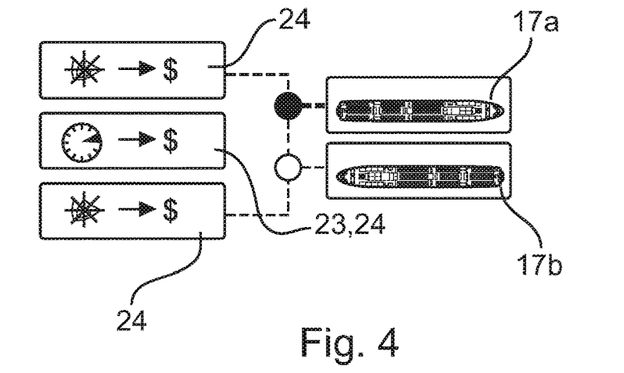
FIG. 4 shows specification of a mission specific reconfiguration parameter for reconfiguring an aircraft configuration according to another exemplary embodiment of the invention.

FIG. 4 shows reconfiguring of an aircraft configuration in view of predetermined aircraft specific data 12 and a mission specific reconfiguration parameter 15, too, wherein boundary conditions as reconfiguration time 23 and reconfiguration costs 23 are fixedly predetermined as to, hence, realize possible alternative aircraft configurations 17a, 17b, 17c. Here, an initial aircraft configuration 13 which is not shown in FIG. 4 may likewise be used, as to design the alternative aircraft configurations 17a, 17b by predetermining the reconfiguration time 23 and the reconfiguration costs 24. However, the design of the alternative aircraft configurations 17a, 17b may also happen without any predetermined initial aircraft configuration 13, so that the alternative aircraft configurations 17a, 17b are generated based on general aircraft specific data 12 and on predetermined reconfiguration time 23 and the reconfiguration costs 24 only. Here, the reconfiguration may happen automatically and an evaluation of the alternative aircraft configuration 17a, 17b which is optimal for a specific mission profile may result from a comparison. This comparison may be executed by the processing unit 16.

Figure 5:
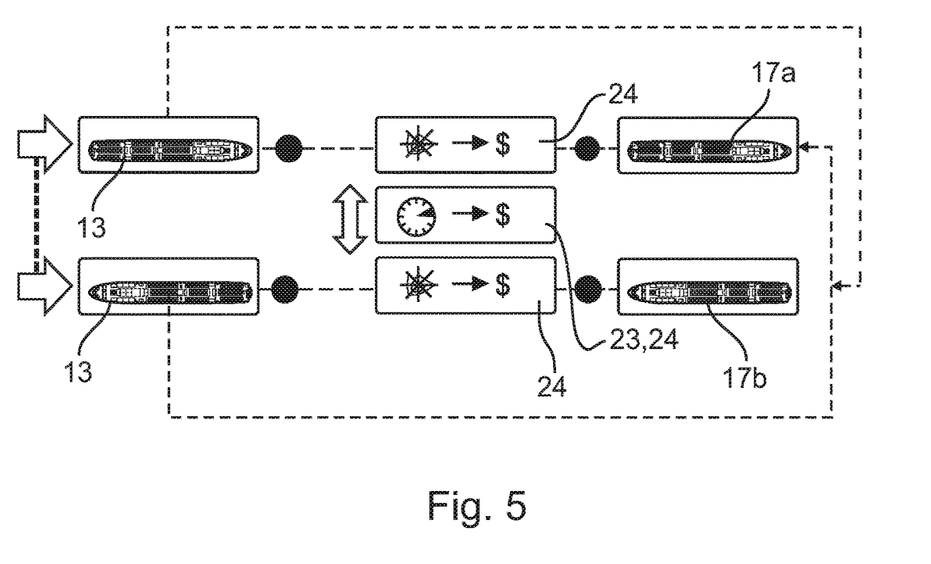
FIG. 5 shows a comparison of two alternative aircraft configurations according to an exemplary embodiment of the invention.

FIG. 5 shows, on the basis of dashed lines, a comparison of two alternative aircraft configurations 17a, 17b which were designed by reconfiguration by means of the aircraft reconfigurator 10. It is noted that also more than two alternative aircraft configurations may be compared with each other. A hierarchy of the designed alternative aircraft configurations 17a, 17b may be determined by such a comparison, so that the most suitable aircraft configuration for a specific mission or for a predetermined cost budget 24 or for a predetermined reconfiguration time 23 may be determined.

Figure 6:
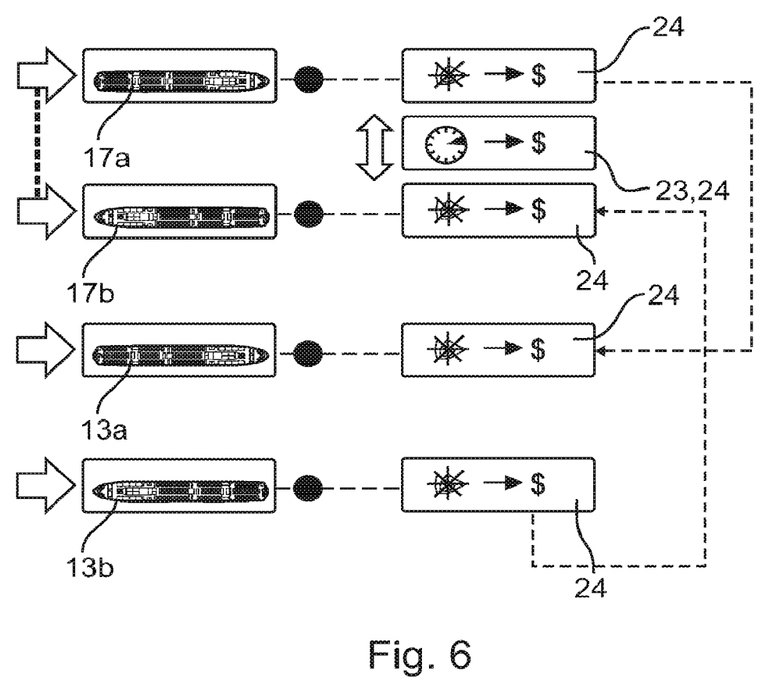
FIG. 6 shows a comparison of an alternative aircraft configuration with a conventional aircraft configuration according to an exemplary embodiment of the invention.

FIG. 6 shows, on the basis of dashed lines, a comparison of two alternative aircraft configurations 17a, 17b with already existing aircraft configurations 13a, 13b or aircraft configurations 13a, 13b being designed otherwise. In other words, reconfiguration layouts 17a, 17b are compared with non-reconfiguration layouts 13a, 13b. In particular, the respective reconfiguration times 23 or the production times and the respective reconfiguration costs 24 or the production costs may be compared with each other. Further, a comparison of the respective performance or of the respective value may be executed.

The aircraft reconfigurator may be configured to select a specific configuration after the comparison being executed, which configuration is optimized with regard to the existing boundary conditions. The boundary conditions may be, for example, complying with predetermined turn-around-times at an airport and/or a rebuild time for reconfiguration, a minimization of the costs related thereto and/or on optimal position of the center of gravity.

It may be provided that the performance of an aircraft configuration 17a, 17b designed by reconfiguration is better than the performance of an aircraft configuration 13a, 13b being designed in another manner. Thereby, it may also be provided that a compatibility with respect to different missions is different for both types. These parameters may be considered in the comparison, as well as the purchasing price and the operating costs. By a realized profit in operating the designed and built aircraft configuration, it can be shown that a reconfiguration makes sense or that advantages are achieved or not.

Figure 7:
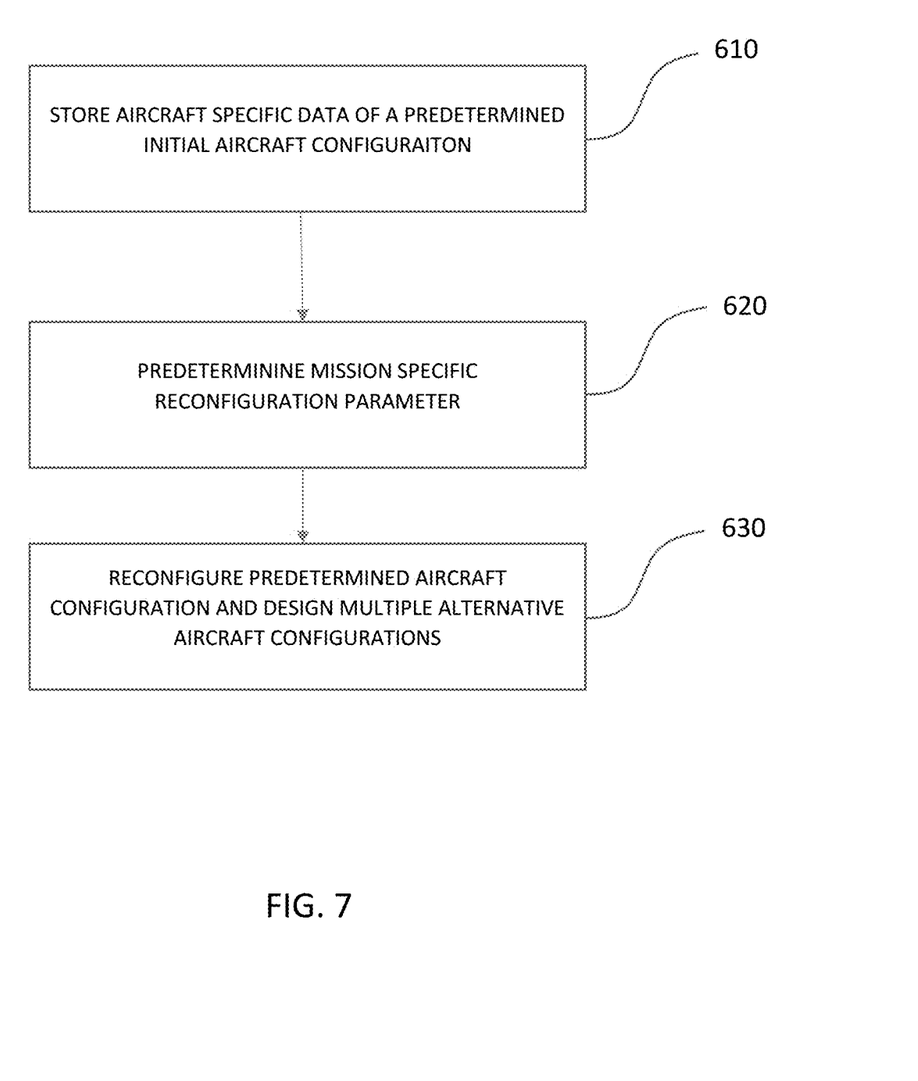
FIG. 7 shows a flow chart of a method for reconfiguring an aircraft configuration according to an exemplary embodiment of the invention.

FIG. 7 shows a flow chart of a method for reconfiguring an aircraft configuration. In a first step 610, storing of aircraft specific data 12 of a predetermined initial aircraft configuration 13 takes place by a storage unit 11. In a second step 620, predetermining a mission specific reconfiguration parameter 15 takes place by an input unit 14. In a further step 630 of the method, reconfiguration of the initial aircraft configuration 13 based on the stored aircraft specific data 12 of the predetermined initial aircraft configuration 13 and the predetermined mission specific reconfiguration parameter 15 takes place by a processing unit 16, as to, thereby, design multiple alternative aircraft configurations 17a, 17b, 17c, each of which comprises a different variant of a cabin layout 18a, 18b, 18c.

For example, the processor is part of a processing unit 16 of the aircraft reconfigurator 10.

Additionally, it is noted that "comprising" does not exclude any other elements or steps and "a" or "an" does not exclude a multitude or plurality. It is further noted that features or steps which are described with reference to one of the above exemplary embodiments may also be used in combination with other features or steps of other exemplary embodiments described above. Reference signs in the claims are not to be construed as a limitation.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An aircraft reconfigurator system comprising:
a storage unit to store aircraft specific data of a predetermined initial aircraft configuration, the predetermined initial aircraft configuration is an already existing aircraft configuration or an existing aircraft;
an input unit to predetermine a mission specific reconfiguration parameter; and
a processing unit to reconfigure the predetermined initial aircraft configuration based on the stored aircraft specific data of the predetermined initial aircraft configuration and the predetermined mission specific reconfiguration parameter, and to design multiple alternative aircraft configurations, each of which comprises a different variant of a cabin layout compared to the predetermined initial aircraft configuration, wherein the mission specific reconfiguration parameter comprises information about an arrangement and/or a number of a first aircraft component within the multiple alternative aircraft configurations such that the arrangement and/or the number of the first aircraft component is defined in each of the multiple alternative aircraft configurations, and wherein the processing unit is configured to position additional aircraft components depending on the arrangement and/or the number of the first aircraft component within the multiple alternative aircraft configurations such that each of the multiple alternative aircraft configurations has a different cabin layout.

2. The aircraft reconfigurator system of claim 1, wherein the aircraft specific data comprise information relating to a design and dimensions of the predetermined initial aircraft configuration.

3. The aircraft reconfigurator system of claim 1, wherein the first aircraft component is a lavatory or a galley within a passenger cabin of the multiple alternative aircraft configurations.

4. The aircraft reconfigurator system of claim 1, wherein the additional aircraft components are seats within the multiple alternative aircraft configuration.

5. The aircraft reconfigurator system of claim 1, wherein the processing unit is configured to determine a required time and/or required costs for reconfiguring the predetermined initial aircraft configuration for each one of the multiple alternative aircraft configurations.

6. The aircraft reconfigurator system of claim 1, wherein the processing unit is configured to determine a production timetable for reconfiguring the predetermined initial aircraft configuration.

7. The aircraft reconfigurator system of claim 1, wherein the predetermined mission specific reconfiguration parameter comprises information relating to a reconfiguration time and/or reconfiguration costs.

8. The aircraft reconfigurator system of claim 1, wherein the processing unit is configured to carry out a comparison of the multiple alternative aircraft configurations.

9. A method of reconfiguring an aircraft configuration, comprising the steps of:

storing of aircraft specific data of a predetermined initial aircraft configuration by a storage unit;

predetermining a mission specific reconfiguration parameter by an input unit; and reconfiguring the predetermined initial aircraft configuration based on the stored aircraft specific data of the predetermined initial aircraft configuration and the predetermined mission specific reconfiguration parameter by a processing unit, to design multiple alternative aircraft configurations, each of which comprises a different variant of a cabin layout compared to the predetermined initial aircraft configuration, wherein the mission specific reconfiguration parameter comprises information about an arrangement and/or a number of a first aircraft component within the multiple alternative aircraft configurations such that the arrangement and/or the number of the first aircraft component is defined in each of the multiple alternative aircraft configurations, and wherein the processing unit is configured to position additional aircraft components depending on the arrangement and/or the number of the first aircraft component within the multiple alternative aircraft configurations such that each of the multiple alternative aircraft configurations has a different cabin layout.

10. A non-transitory computer readable medium having program instructions stored thereon that, when executed on a processor of an aircraft reconfigurator system, instructs the aircraft reconfigurator system to execute a method comprising the steps of:

storing of aircraft specific data of a predetermined initial aircraft configuration by a storage unit;

predetermining a mission specific reconfiguration parameter by an input unit; and reconfiguring the predetermined initial aircraft configuration based on the stored aircraft specific data of the predetermined initial aircraft configuration and the predetermined mission specific reconfiguration parameter by a processing unit, to design multiple alternative aircraft configurations, each of which comprises a different variant of a cabin layout compared to the predetermined initial aircraft configuration, wherein the mission specific reconfiguration parameter comprises information about an arrangement and/or a number of a first aircraft component within the multiple alternative aircraft configurations such that the arrangement and/or the number of the first aircraft component is defined in each of the multiple alternative aircraft configurations, and wherein the processing unit is configured to position additional aircraft components depending on the arrangement and/or the number of the first aircraft component within the multiple alternative aircraft configurations such that each of the multiple alternative aircraft configurations has a different cabin layout.

* * * * *